(12) United States Patent
Kuhlmann et al.

(10) Patent No.: US 12,326,357 B2
(45) Date of Patent: Jun. 10, 2025

(54) METHOD OF MANUFACTURING A WEIGHING SYSTEM, GRAVIMETRIC MEASURING DEVICE AND METHOD OF OPERATING THE SAME

(71) Applicant: SARTORIUS LAB INSTRUMENTS GMBH & CO. KG, Goettingen (DE)

(72) Inventors: Otto Kuhlmann, Bovenden (DE); Matthias Geisler, Noerten-Hardenberg (DE)

(73) Assignee: SARTORIUS LAB INSTRUMENTS GMBH & CO. KG, Goettingen (DE)

( * ) Notice: Subject to any disclaimer, the term of this patent is extended or adjusted under 35 U.S.C. 154(b) by 321 days.

(21) Appl. No.: 17/879,373

(22) Filed: Aug. 2, 2022

(65) Prior Publication Data

US 2022/0373383 A1 Nov. 24, 2022

Related U.S. Application Data

(63) Continuation of application No. PCT/EP2021/050121, filed on Jan. 6, 2021.

(30) Foreign Application Priority Data

Feb. 3, 2020 (DE) .................... 10 2020 102 606.4

(51) Int. Cl.
*B29C 64/30* (2017.01)
*B29C 69/00* (2006.01)
(Continued)

(52) U.S. Cl.
CPC .............. *G01G 7/02* (2013.01); *B29C 64/30* (2017.08); *B29C 69/001* (2013.01); *B33Y 40/20* (2020.01); *B29L 2031/752* (2013.01)

(58) Field of Classification Search
CPC .................... B22F 10/66; B22F 10/64
See application file for complete search history.

(56) References Cited

U.S. PATENT DOCUMENTS

| 4,497,386 A | 2/1985 | Meier |
| 4,734,671 A | 3/1988 | Eisele et al. |
| (Continued) | | |

FOREIGN PATENT DOCUMENTS

| CN | 105143838 A | 12/2015 |
| CN | 107014469 A | 8/2017 |
| (Continued) | | |

OTHER PUBLICATIONS

International Preliminary Report on Patentability, PCT/EP2021/050121, Dec. 10, 2021, 7 pages.
(Continued)

*Primary Examiner* — Virak Nguon
(74) *Attorney, Agent, or Firm* — Edell, Shapiro & Finnan, LLC

(57) ABSTRACT

A method for manufacturing a weighing system (10) includes, first, modeling a blank that includes a base (12) having at least one wall (26) and a lever (20) hinged to the base (12) via thin-section joints (14) and secured to the base (12) via material bridges. The lever (20) has a lever portion adjacent to the wall (26), wherein the wall (26) and the lever portion adjacent to the wall are each provided with an aperture (32, 34), and wherein the apertures (32, 34) are both aligned with each other. The manufacturing method further includes thereafter cutting open the material bridges. Before the material bridges are cut open, however, a fixing bolt (36) is pushed into the apertures (32, 34) in such a way that it engages positively in the apertures (32, 34) during the cutting open of the material bridges.

4 Claims, 3 Drawing Sheets

(51) Int. Cl.
    *B29L 31/00*     (2006.01)
    *B33Y 40/20*     (2020.01)
    *G01G 7/02*     (2006.01)

(56) References Cited

U.S. PATENT DOCUMENTS

| | | |
|---|---|---|
| 5,923,000 A | 7/1999 | Tschopp et al. |
| 6,326,562 B1 | 12/2001 | Burkhard et al. |
| 9,927,284 B2 | 3/2018 | Graf |
| 10,139,266 B2 | 11/2018 | Scheu et al. |
| 2016/0033320 A1 | 2/2016 | Graf |
| 2020/0408590 A1* | 12/2020 | Gottfriedsen .......... G01G 21/24 |

FOREIGN PATENT DOCUMENTS

| | | |
|---|---|---|
| DE | 29708886 U1 | 7/1997 |
| DE | 202007005665 U1 | 7/2007 |
| DE | 102018131125 A1 | 6/2020 |
| EP | 0990880 A2 | 4/2000 |
| EP | 2986955 A1 | 2/2016 |
| GB | 2124396 A | 2/1984 |
| JP | 2017161299 A * | 9/2017 |
| WO | 2014169981 A1 | 10/2014 |

OTHER PUBLICATIONS

International Search Report, PCT/EP2021/050121, Apr. 21, 2021, 2 pages.
Chinese Office Action with English translation, Application No. 202180012325.X, Mar. 22, 2024, 11 pages.

\* cited by examiner

METHOD OF MANUFACTURING A WEIGHING SYSTEM, GRAVIMETRIC MEASURING DEVICE AND METHOD OF OPERATING THE SAME

CROSS REFERENCE TO RELATED APPLICATIONS

This is a Continuation of International Application PCT/EP2021/050121, which has an international filing date of Jan. 6, 2021, and which claims the priority of German Patent Application 10 2020 102 606.4, filed Feb. 3, 2020. The disclosures of both applications are incorporated in their respective entireties into the present Continuation by reference.

FIELD OF INVENTION

The invention relates to a method of manufacturing a weighing system, wherein
   first a blank is modeled, comprising
   a base having at least one wall, and
   a lever hinged to the base via thin-section joints and secured to the base via material bridges, the lever having a lever portion adjacent the wall, wherein the wall and the lever portion adjacent thereto are each provided with an aperture, said apertures being aligned with each other, and
   then, the material bridges are cut open.

BACKGROUND

The invention further relates to a gravimetric measuring device comprising
   a base having at least one wall,
   a lever pivotally mounted relative to the base and having a lever portion adjacent the wall, the wall and the lever portion adjacent thereto each having an aperture, said apertures being aligned with one another in the state of equilibrium, and
   a fixing bolt which is axially displaceable in the apertures in such a way that it engages therein in a form-fitting manner.
Finally, the invention relates to a method of operating such a gravimetric measuring device.

A conventional gravimetric measuring device is known from JP 2017161299-A.

Gravimetric measuring devices, in particular electronic gravimetric measuring devices, especially those operating according to the principle of electromagnetic compensation (so-called EMF balances) are generally known to the skilled person. They regularly comprise a so-called weighing system, i.e. a complicated arrangement of folded levers, plungers and joints, which connects a load receptor of the measuring device with the actual weighing sensor, for example a coil-magnet system, thereby realizing a ratio of displacement or force. Such a weighing system regularly comprises a base, which serves as a fixed reference point and, within the measuring device, is typically firmly connected to the device's housing and supports the fixed part of the sensor system, in particular a coil-magnet system. Levers and plungers are movable relative to this base, in particular articulated to the base via joints. So-called monolithic weighing systems are widely used in modern precision balances. They are characterized by the fact that all or at least almost all components of the weighing system are integrally connected to each other, in particular modeled from a coherent block of material, typically aluminum.

During the manufacture of such a weighing system, the blank assumes an increasingly filigree structure in the course of the process. Nevertheless, the forces acting on it and its components, both as a result of the machining itself and as a result of its handling, in particular acceleration and tension forces, remain essentially the same. They are regularly significantly greater than the forces acting on a finished measuring device during operation of its weighing system. Particularly at a late stage in the manufacturing process, there is therefore a risk of damage to the very sensitive joints, typically designed as thin-section joints, if levers and/or plungers are excited to excessive deflections by said forces. To prevent this, it is common practice to fix or leave fixed at least the main lever of the system to the base via material bridges and to cut open these material bridges only as a final machining step. In this way, relative movements of levers, plungers and joints relative to the base are prevented until the final machining step. In addition, especially with EMF balances, the still fixed lever is used as a reference to adjust the (usually optical) scanning sensor system for the lever position, which is required to control the measuring current.

However, it has been shown that the cutting open of the material bridges, which is often performed as a nip-off, can lead to considerable lever deflection, so that, especially in the final manufacturing stage of the weighing system, the blank is particularly at risk of damage and thus rejection.

From the above-mentioned JP 2017-161299 A, a gravimetric measuring device with a weighing system of the type described above is known, wherein the lever, in particular the main lever, of the weighing system and a wall of the base adjacent to the lever's end portion have apertures in alignment with one another. This aligned relative position is particularly given in the equilibrium position of the lever or the measuring device. In said publication, it is proposed to fix the lever for the purpose of transporting the measuring device relative to the base by pushing a fixing pin into said apertures in a form-fitting manner. Due to the positive fit, the pin is fixed in radial direction to the base on the one hand; on the other hand, also the lever is fixed to the pin in radial direction, in particular perpendicular to its pivot axis. In this way, relative movement of the lever to the base is prevented so that no acceleration forces occurring during transport of the measuring device can lead to excessive deflection of the lever that could damage the joints.

SUMMARY

It is an object of the present invention to further develop a conventional manufacturing process for a weighing system so that damage to the joints is prevented also during the final manufacturing phase.

According to one formulation of the invention, this object is achieved in that, before the material bridges are cut open, a fixing bolt is pushed into the apertures in such a way that it engages positively in the apertures during the cutting open of the material bridges.

Preferred embodiments associated with the present invention are disclosed and claimed in the present application as well.

One aspect associated with the invention involves translating and applying concepts and insights employed for lever fixing using fixing bolts, which are known from the context of securing completed gravimetric measuring devices for transport, to the manufacturing process of the weighing system. In particular, the inventors have recognized that the forces causing damage to a measuring device during its transport are quite similar to those that produce joint damage when the material bridges are cut open in the final manufacturing step of a weighing system, even though these two respective processes involve completely different physical principles. Based on these findings and insights, the present invention provides a novel use of a fixing bolt comparable to the known transport pin, but here for fixing the lever during the manufacturing process of the weighing system, in particular for fixing the lever during the final manufacturing step, i.e. during the cutting open of the material bridges between the lever and the base.

In a preferred embodiment, it is provided that the fixing bolt has at least two coaxial axial portions, namely a distal end portion and a main portion proximally adjoining the latter, the cross-section of the main portion corresponding at least in regions to the cross-section of the lever aperture and being larger than the cross-section of the distal end portion. For the above-described aspects and effects according to the invention in the context of weighing system manufacture, this special dimensioning of the fixing bolt has no significance. In this context, a simple cylindrical bolt would also be able to perform the described function as a fixing bolt for fixing the lever in a securing position. The special significance of the above-mentioned dimensioning is only revealed in the context of a conventional gravimetric measuring device, which is characterized by said dimensioning of the fixing bolt. Such a fixing bolt dimensioning permits in particular two axial positions of the fixing bolt, namely a rest position in which the fixing bolt, which is mounted in the wall aperture in a form-fitting and axially displaceable manner, is advanced in such a way that its main portion engages in the lever aperture in a form-fitting manner. This rest position can also be referred to as the transport position and corresponds to the securing position during the final manufacturing step described in the context of the manufacturing process. It is characterized by a positive locking of the lever to the base via the fixing bolt. A second working position made possible by said dimensioning of the fixing bolt is characterized by the fact that the fixing bolt is retracted with respect to the rest position described above in such a way that its distal end portion engages with radial clearance in the lever aperture and its main portion is positioned axially outside the lever aperture. The positive fit of the fixing bolt main portion within the wall aperture is maintained even in the working position. In other words, the working position is characterized by the fact that, although the lever is pivotable relative to the base, its deflection is limited by the distal end portion of the fixing bolt passing through its aperture. In the event of excessive deflection of the lever, as can occur, for example, when a load is placed too hard on the load receptor of the gravimetric measuring device, the lever strikes with the inner wall of its aperture against the distal end portion of the fixing bolt which passes through it. Further deflection, which could lead to damage to the joints, is reliably avoided in this way.

A fixing bolt of this size therefore has a fourfold function: first, it serves to reduce scrap during the manufacture of the weighing system; second, it serves to fix the lever as a reference for adjusting the scanning electronics; third, it serves (in a manner known in principle) to secure the gravimetric measuring device for transport; and fourth, it forms a safety stop for the lever during operation of the gravimetric measuring device.

This results in the operating method according to the invention for a gravimetric measuring device preferably manufactured according to the invention, which is characterized by the fact that the fixing bolt is mounted in the wall aperture in a form-fitting and axially displaceable manner, wherein said fixing bolt is, as needed, pushed forward in such a way that its main portion engages positively in the lever aperture in order to transfer the measuring device into a rest position and retracted in such a way that its distal end portion engages with radial clearance in the lever aperture and its main portion is positioned axially outside the lever aperture, in order to transfer the measuring device to a working position.

The skilled person will recognize that the term aperture in the present context is to be understood broadly and includes both through openings and blind holes. The cross-section is to be understood as the respective functionally relevant cross-section, i.e. as a rule the respective smallest clear cross-section of an aperture and the outer cross-section of the respective concretely interacting axial portion of a body. Also, the skilled person will recognize that the term reach-through does not necessarily imply a complete reach-through.

The modeling of the blank within the framework of the weighing system manufacturing process according to the invention can be carried out, as is known in principle, by subtractive machining of a monolithic block of material. In particular, it is possible to create the weighing system according to the invention in basically the same way, namely by milling, drilling and grinding a block of material, in particular a block of aluminum, as is conventionally known. Alternatively, the modeling of the blank can also be carried out, at least in areas, by an additive manufacturing process. In its most extensive embodiment, the entire weighing system is manufactured additively, for example by 3D printing. However, combinations of subtractive and additive process steps are also possible in the context of the present invention.

The cross-sections of the distal end portion and the main portion of the fixing bolt are preferably circular. In particular, in the context of a subtractive manufacturing process for the weighing system, such shapes can be created by simply drilling the blank. In the context of an additive modeling process for the weighing system, more complex cross-sectional shapes are also feasible, which can then simultaneously implement an anti-rotation feature for the fixing bolt. In practice, however, the choice of circular cross-sectional shapes has proven successful.

The above-described basic shape of the fixing bolt according to the invention with a thinner distal end portion and a thicker main portion can be designed in a more complex manner in practice. Thus, in an advantageous further embodiment of the invention, it is provided that the main portion of the fixing bolt is divided into two axial subsections, namely a distal subsection and a proximal subsection, the cross-section of the proximal subsection being larger than the cross-section of the distal subsection and corresponding to the cross-section of the wall aperture. Notwithstanding this embodiment of the main portion, of course, the distal end portion is provided with a cross-section that is again smaller. In this embodiment, the proximal subsection of the fixing bolt's main portion essentially serves for the bolt's bearing in the wall aperture. Accordingly, their cross-sections also match. The distal subsection of the fixing bolt's main portion serves for transport securing and is that part of the fixing bolt which can be inserted positively into the lever aperture for the purpose of transport securing. The distally adjoining, distal end portion, on the other hand, serves for a safety stop during operation and engages with radial clearance in the lever aperture.

Variants are also feasible in which the distal end portion extends up to an opposite wall and into a recess located therein. This recess and the distal end portion of the fixing bolt are preferably dimensioned so that the latter can engage positively in the former. This provides a two-sided bearing of the fixing bolt, which in principle allows greater stability of the fixing bolt positioning than with a one-sided bearing. However, it has been found in practice that the length dimension of the fixing bolt in particular is typically sufficiently small to achieve completely adequate stability even with single-sided bearing.

The transition between the distal end portion and the main portion of the fixing bolt is preferably provided with a chamfer. When the fixing bolt or the gravimetric weighing device is transferred from its operating position to its rest or transport position, this chamfering causes it to be automatically transferred to the equilibrium position when the lever is slightly deflected from its equilibrium position. In particular, excessive application of a lateral force to the lever is avoided.

The axial displacement of the fixing bolt can be performed manually, for example. In this case, it is particularly advantageous if the fixing bolt can be locked in different axial positions with, e.g., a locking screw, as is generally preferred, which can be designed, for example, as a clamping screw or as a force-locking and form-fitting locking screw. Accidental displacement is thus largely ruled out.

However, as an alternative to the manual fixing bolt displacement, it can also be provided that the gravimetric measuring device further comprises a motor drive, with which the fixing bolt can be displaced axially. The motor control can be coupled to the general balance control. In this way, the fixing bolt displacement is completely freed of any potentially incorrect operation. Since the motor generally also fixes the fixing bolt in the respective target position, the above-mentioned locking screw can usually also be dispensed within this embodiment.

Further details and advantages of the invention will be apparent from the following specific description and drawings.

BRIEF DESCRIPTION OF THE DRAWINGS

These show.

DETAILED DESCRIPTION

Identical reference signs in the figures indicate identical or analogous elements.

Figure 1:
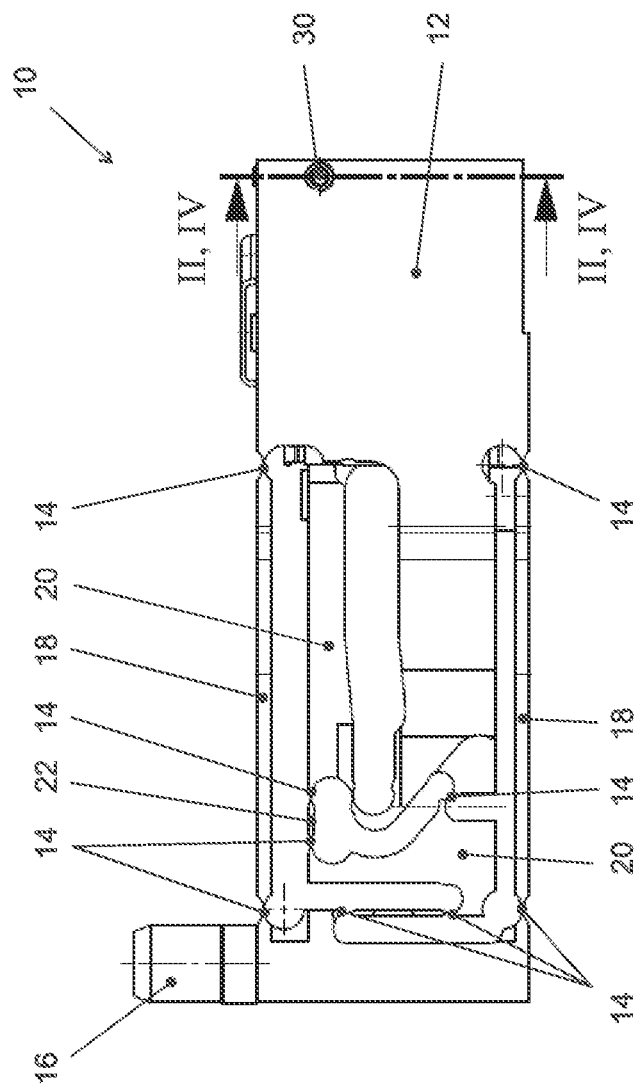
FIG. 1: A side view of an exemplary weighing system.

FIG. 1 shows, for purposes of orientation, a side view of an exemplary weighing system 10 in which the present invention is implemented. The weighing system 10 comprises a base 12, which is to be understood as its fixed reference point. A load receptor 16, which typically supports a weighing pan within a complete gravimetric measuring device, is articulated by thin-section joints 14 with plungers 18. Deflections of the load receptor 16 are transmitted via a multi-stage lever 20 to a sensor not shown in FIG. 1, which is located inside the base 12 of the operational gravimetric measuring device. Individual sections of the lever 20 are connected to each other via further thin-section joints 14 and a coupling member 22.

A free end portion of the lever 20 is located in the area of the intersection line II, IV-II, IV and is shown in greater detail in FIGS. 2 through 5.

Figure 2:
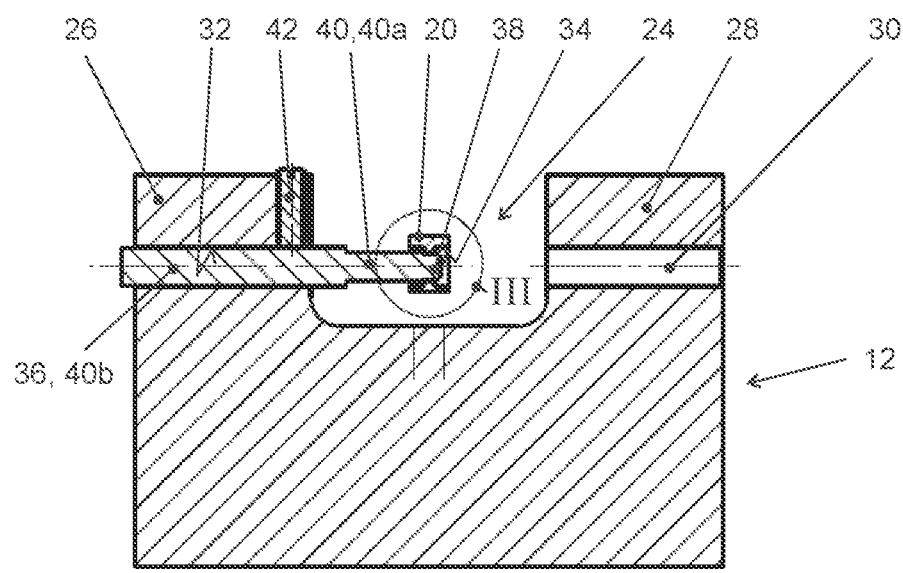
FIG. 2: a sectional view through the weighing system of FIG. 1 along the line of intersection II, IV-II, IV.
Figure 3:
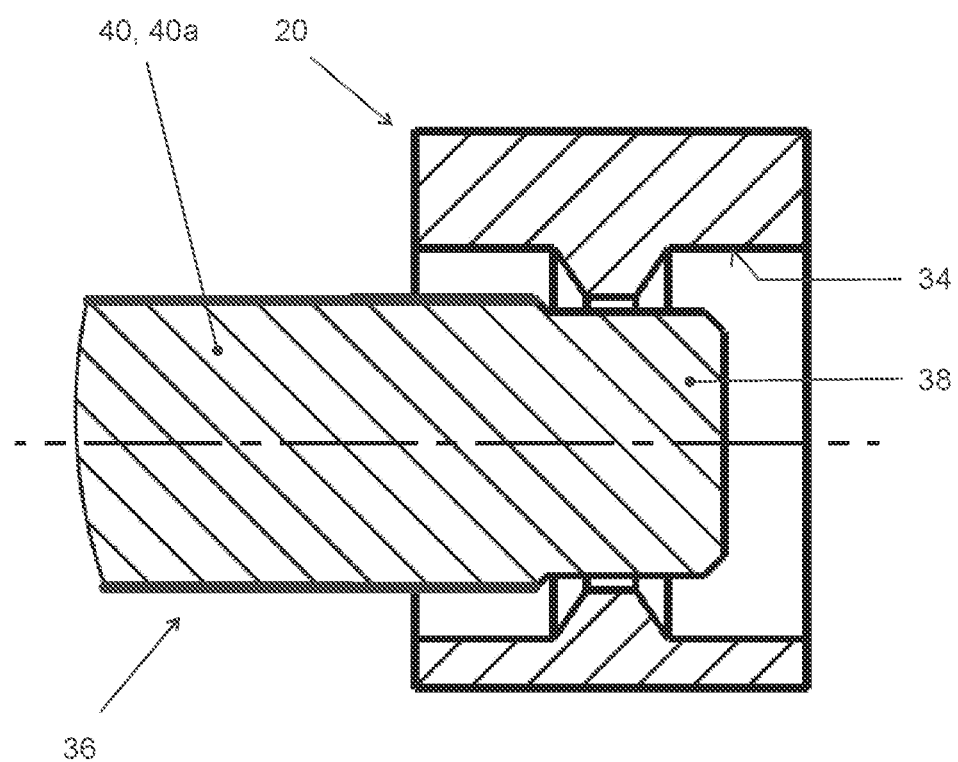
FIG. 3: an enlargement of section III of FIG. 2,
FIG. 4: a sectional view through the weighing system of FIG. 1 along the line of intersection II, IV-II, IV.
Figure 4:
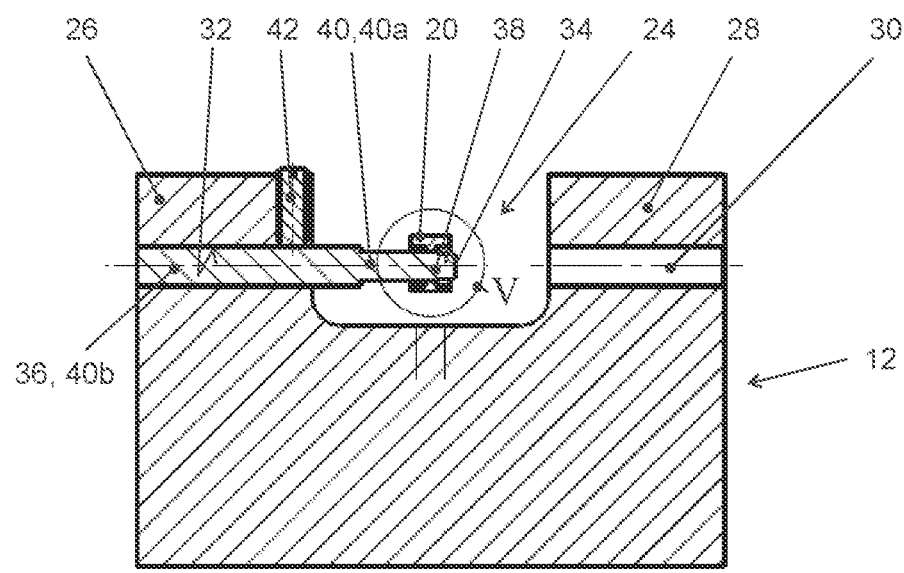
Figure 5:
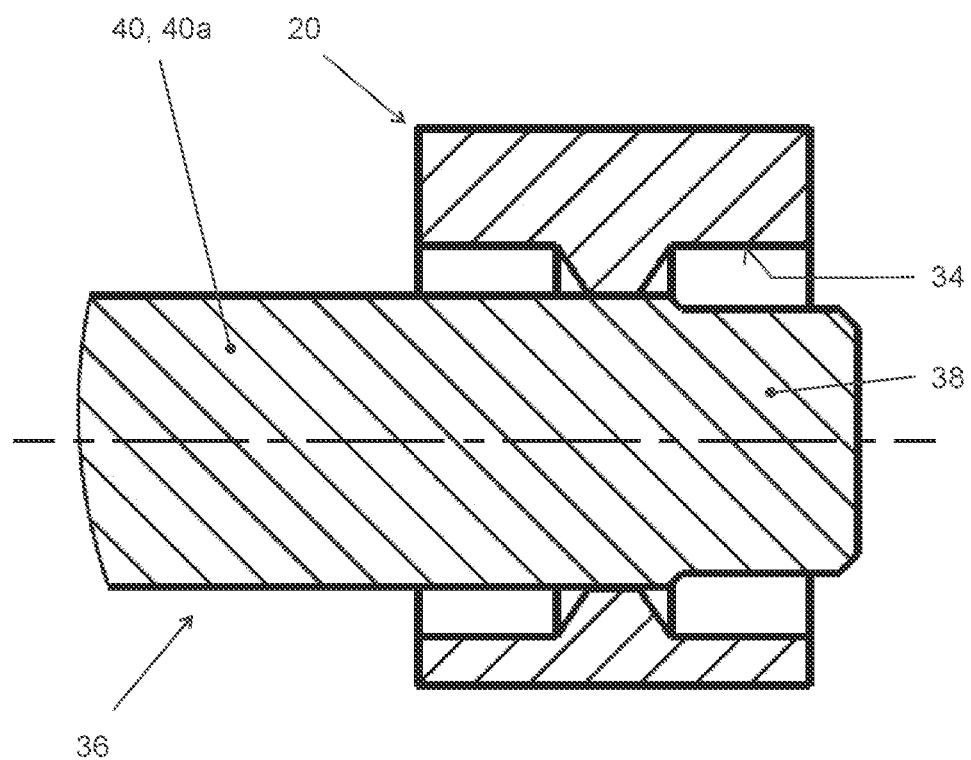
FIG. 5: an enlargement of the section V of FIG. 4.

FIGS. 2 and 4 show the weighing system 10 in a sectional view along the line of intersection II, IV-II, IV in two different positions, namely in an operating position (FIG. 2) and a rest position (FIG. 4). FIGS. 3 and 5 each show enlarged representations corresponding to magnification circles III in FIG. 2 and V in FIG. 4, respectively. FIGS. 2 through 5 will be discussed below, and, to the extent possible, together with one another.

In the illustrated embodiment, the base 12 forms a lever channel 24 extending between two walls 26, 28. The wall 26 shown on the left in FIGS. 2 and 4 will be referred to hereinafter simply as "wall" 26, whereas the wall 28 shown on the right in FIGS. 2 and 4 will be addressed as "opposite wall" 28. Both walls 26, 28 are penetrated by a bore 30, which fulfills the function of a bearing channel 32 inside wall 26 and, in the embodiment shown, does not fulfill any function inside the opposite wall 28 and is here merely due to practical considerations of the manufacturing process.

The lever 20 also has an aperture 34 whose cross-section (at its narrowest point) is smaller than the cross-section of the aperture 32 of the wall 26 serving as the bearing channel. In the embodiment shown, the lever aperture 34 is provided with a blade-like taper which defines its cross-section (relevant to the invention) and ensures increased precision. In principle, the lever aperture 34 could also be designed with a uniform cross-section.

A fixing bolt 36 is axially slidably mounted in the wall aperture 32. The fixing bolt 36 has a distal end portion 38 of smaller cross-section and a main portion 40 of larger cross-section. In the illustrated embodiment, the main portion 40 is divided into a distal subsection 40a and a proximal subsection 40b. The cross-section of the distal end portion 38 is smaller than the cross-section of the lever aperture 34; the cross-section of the distal subsection 40a of the main portion 40 corresponds to the cross-section of the lever aperture 34; and the cross-section of the proximal subsection 40b of the main portion 40 corresponds to the cross-section of the wall aperture 32. In this way, the fixing bolt 36 is supported in the wall aperture 32 so as to be tilt-resistant and axially displaceable.

In the operating position shown in FIGS. 2 and 3, the fixing bolt 36 is positioned such that its distal end portion 38 fully engages the narrowest region of the lever aperture 34 in a spaced manner. Thus, the lever 20 is pivotable to a limited extent relative to the base 12. This is perfectly sufficient, particularly in the case of balances operating according to the EMF principle, where only infinitesimal lever deflections occur during proper operation. However, in the event of improper handling, for example if a load is placed too hard on the weighing pan of the gravimetric measuring device, larger deflections may occur, which, however, are stopped in the operating position shown by the inner wall of the lever aperture 34 striking the distal end portion 38 of the fixing pin 36. Overloading of the sensitive thin-section joints 14 is prevented in this way.

After operation and in particular in preparation for transport of the gravimetric measuring device, the fixing bolt 36 can be advanced axially so that it assumes the position shown in FIGS. 4 and 5. Here, the main portion 40, in particular its distal subsection 40a, positively penetrates the lever aperture 34. This prevents any deflection of the lever 20.

In order to prevent unintentional axial displacement of the fixing bolt 36, the embodiment shown additionally has a locking screw 42, which opens into the bearing channel 32 and is designed as a simple clamping screw in the embodiment shown, with which the fixing bolt 36 can be clamped.

Of course, the embodiments discussed in the specific description and shown in the figures are only illustrative examples of embodiments of the present invention. The skilled person is provided with a wide range of possible variations in light of the present disclosure. In particular, it is feasible to extend the distal end portion 38 of the fixing bolt 36 to the opposite wall 28 and to mount it there in an axially displaceable manner in a correspondingly dimensioned recess.

LIST OF REFERENCE SIGNS

10 weighing system
12 base
14 thin-section joint
16 load receptor
18 plunger
20 lever
22 coupling element
24 lever channel
26 wall
28 opposite wall
30 bore
32 wall aperture/bearing channel
34 lever aperture
36 fixing bolt
38 distal end portion of 36
40 main portion of 36
40a distal subsection of 40
40b proximal subsection of 40
42 Locking screw

What is claimed is:

1. Method of manufacturing a weighing system, comprising:
modeling a blank that comprises
a base having at least one wall, and
a lever hinged to the base via thin-section joints and secured to the base via material bridges, wherein the lever has a lever portion adjacent the wall and
wherein the wall and the adjacent lever portion each have a respective aperture, and wherein the respective apertures are aligned with each other,
after said modeling, cutting open the material bridges, and
after said modeling of the blank but before said cutting open of the material bridges, pushing a fixing bolt into the apertures such that the fixing bolt engages positively in the respective apertures during said cutting open of the material bridges.

2. Method according to claim 1,
wherein said modeling further comprises modeling the fixing bolt to comprise at least two coaxial axial portions comprising a distal end portion and a main portion proximally adjoining the distal end portion, wherein a cross-section of the main portion corresponds at least in regions to a cross-section of the aperture of the lever portion and is larger than a cross-section of the distal end portion.

3. Method according to claim 1, wherein said modeling of the blank comprises subtractive machining of a monolithic block of material.

4. Method according to claim 1, wherein said modeling of the blank comprises, at least in areas of the blank, an additive manufacturing method.

\* \* \* \* \*